United States Patent
Urban et al.

(10) Patent No.: US 7,940,905 B2
(45) Date of Patent: *May 10, 2011

(54) METHOD AND SYSTEM FOR PROVIDING CALLING NAME IDENTIFICATION

(75) Inventors: Ron Urban, Woodridge, IL (US); Wally Malinowski, Naperville, IL (US); Jim Kovarik, Batavia, IL (US); Bill Wojtozak, Lockport, IL (US); Nancy Book, Naperville, IL (US); M. Lynda Marek, Harrison Township, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 671 days.

This patent is subject to a terminal disclaimer.

(21) Appl. No.: 12/014,360

(22) Filed: Jan. 15, 2008

(65) Prior Publication Data

US 2008/0130855 A1 Jun. 5, 2008

Related U.S. Application Data

(63) Continuation of application No. 10/995,084, filed on Nov. 22, 2004, now Pat. No. 7,343,007, which is a continuation of application No. 08/757,892, filed on Nov. 27, 1996, now Pat. No. 6,891,939.

(51) Int. Cl.
*H04M 1/56* (2006.01)
*H04M 15/06* (2006.01)
(52) U.S. Cl. ............ 379/142.01; 379/142.06; 379/88.21
(58) Field of Classification Search .............. 379/142.01, 379/142.04–142.06, 142.08, 142.1, 142.17, 379/88.21, 93.23, 188, 189, 200, 201.01, 379/201.04, 201.07, 201.08, 207.02, 220.01, 379/221.08, 221.09, 244, 245
See application file for complete search history.

(56) References Cited

U.S. PATENT DOCUMENTS

| | | | |
|---|---|---|---|
| 5,033,076 A | 7/1991 | Jones et al. | |
| 5,425,090 A | 6/1995 | Orriss | |
| 5,430,719 A | 7/1995 | Weisser, Jr. | |
| 5,438,568 A | 8/1995 | Weisser, Jr. | |
| 5,479,495 A | 12/1995 | Blumhardt | |
| 5,499,290 A | 3/1996 | Koster | |
| 5,517,562 A | 5/1996 | McConnell | |
| 5,519,772 A | 5/1996 | Akman et al. | |
| 5,526,413 A | 6/1996 | Cheston, III et al. | |
| 5,533,106 A | 7/1996 | Blumhardt | |
| 5,550,904 A | 8/1996 | Andruska et al. | |
| 5,566,235 A | 10/1996 | Hetz | |
| 5,572,583 A | 11/1996 | Wheeler, Jr. et al. | |
| 5,696,815 A | 12/1997 | Smyk | |
| 5,727,057 A | 3/1998 | Emery et al. | |
| 5,729,592 A | 3/1998 | Frech et al. | |
| 5,850,435 A | 12/1998 | Devillier | |
| 5,854,836 A | 12/1998 | Nimmagadda | |
| 5,864,612 A | 1/1999 | Strauss et al. | |
| 5,974,128 A | 10/1999 | Urban et al. | |
| 6,097,802 A | 8/2000 | Fleischer, III et al. | |
| 6,343,120 B1 | 1/2002 | Rhodes | |
| 6,891,939 B1 * | 5/2005 | Urban et al. | 379/142.01 |
| 7,343,007 B2 * | 3/2008 | Urban et al. | 379/142.01 |
| 7,627,104 B2 * | 12/2009 | Urban et al. | 379/207.02 |

* cited by examiner

*Primary Examiner* — Quoc D Tran
(74) *Attorney, Agent, or Firm* — Cantor Colburn LLP

(57) ABSTRACT

Systems and methods for identifying a name associated with a calling party's telephone number are disclosed. Generally, a first network element determines whether there are any restrictions on the disclosure of a name associated with a calling party's telephone number; obtain the name associated with the calling party's telephone number when it is determined that the calling party's telephone number is present in a database; and transmit the name associated with the calling party's telephone to a second network element.

18 Claims, 2 Drawing Sheets

METHOD AND SYSTEM FOR PROVIDING CALLING NAME IDENTIFICATION

RELATED APPLICATIONS

The present application is a continuation of U.S. patent application Ser. No. 10/995,084 (still pending), filed Nov. 22, 2004 now U.S. Pat. No. 7,343,007, which is a continuation of U.S. patent application Ser. No. 08/757,892 (now U.S. Pat. No. 6,891,939), filed Nov. 27, 1996, the entirety of each of which is hereby incorporated by reference.

FILED OF THE INVENTION

This invention relates generally to telephone services and more specifically to enhanced caller identification services.

BACKGROUND

Local telephone service providers offer a variety of optional services to their customers. The services can be broadly categorized as originating services and terminating services. Originating services are controlled by the originating or calling party's central office when the calling party places a call. In comparison, terminating services are controlled by the terminating or called party's central office when an attempt to terminate a call occurs.

One example of a terminating service is "caller identification." Caller identification provides the called party with the name and telephone number of the calling party. Caller identification is typically provided to a subscriber by its local central office. In particular, each central office ordinarily has access to a local database containing telephone numbers and the corresponding names of people within its local area. Prior to terminating a call to the called party, the central office searches its database for the telephone number of the calling party. If the telephone number is found within the database, the name corresponding to that number will be accessed and delivered to the called party by the central office.

Terminating services are typically provided by equipment located at the called party's central office, which incorporates the software and electronics hardware necessary to implement the service. As a consequence, to "roll out" or provide a new service to customers served by different central offices, each central office must be individually equipped with special equipment implementing the new service. Therefore, if a telephone operating company purchases such equipment from a number of different vendors, each vendor must design and implement the equipment required to provide the new service into their own existing equipment.

This architecture utilizing local central office equipment for implementing services presents problems for telephone service providers. To design, implement and equip each central office with new equipment delays the time in which new services can be introduced. Such delays prolong the time before additional revenues from the new services may be received. Another problem is the limited flexibility of the system. In particular, in order for a telephone operating company to "roll out" a new service, each vendor must design and implement the equipment to provide the new feature. This may also result in delays and loss of revenue.

Presently, advanced intelligent networks (AIN) are replacing the network control systems previously located within each central office. AINs incorporate several network elements such as a number of signal switching points (SSPs) and a service control point (SCP) to create a network. An AIN is operated by a centralized control system that is located within the SCP.

The present embodiment of the invention allows the caller identification service to be removed from individual central office databases and integrated into a central AIN database. Bringing the caller identification into the AIN database allows the caller identification to operate compatibly with other AIN features, such as calling party pays and alternate routing. New features may be implemented through the centrally controlled AIN, as opposed to each individual central office.

DETAILED DESCRIPTION OF THE DRAWINGS

Figure 1:
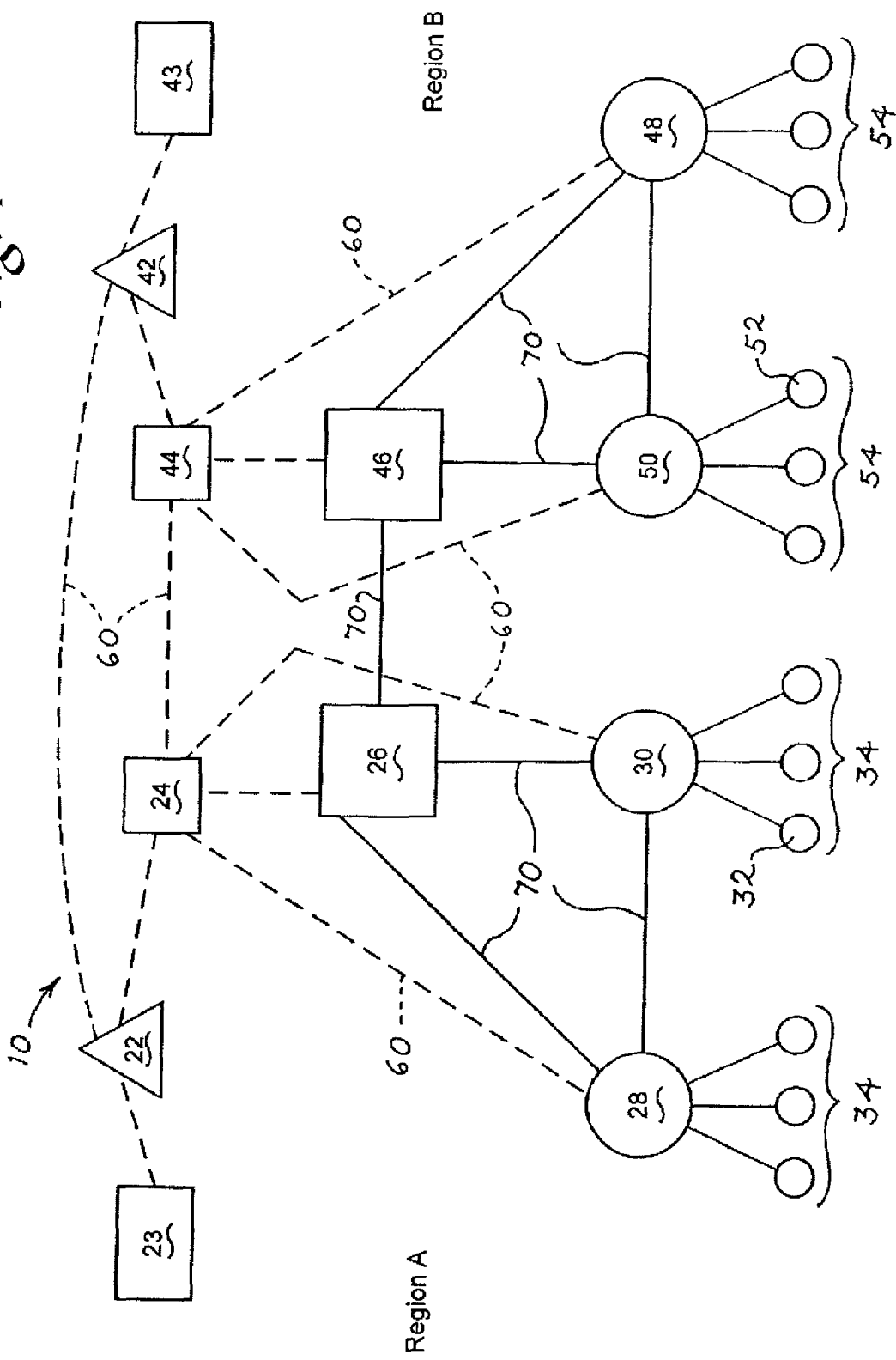
FIG. 1 is a block diagram of a telephone network system.

FIG. 1 shows a modern telephone network 10. Such a telephone network may have network elements including signal switching points (SSP) 28, 30, 48, 50, signal transfer points (STP) 24, 44, tandem switches 26, 46 and service control points (SCP) 22, 42. These elements typically transfer network signaling protocols 60 and voice and data traffic 70 between one another.

For example, SSPs 28, 30, 48, 50 and tandem switches 26, 46 typically transfer voice and data traffic 70. SSPs 28, 30, 48, 50 also communicate with STPs 24, 44 to transfer network signaling protocols 60, such as those defined by Signaling System 7, which is well known in the art, to control the network switching of voice and data traffic.

Preferably, subscribers 34, 54 gain access to the network through the SSPs 28, 30, 48, 50. A SSP is similar to a local telephone central office equipped with a voice switch such as an AT&T #5 ESS or a Nortel DMS-100, well known to those skilled in the art. Central offices equipped with software implementing advanced intelligent network (AIN) features are designated as SSPs.

As shown in FIG. 1, the telephone network may be divided into regions, such as region A and region B. Each region may include several central offices or SSPs. For example, SSPs 28, 30 within region A send and receive network signaling protocols 60 to and from STP 24 which services region A. SSPs 28, 30 within region A send voice and data traffic 70 to and from tandem switch 26 located within region A, as well as other SSPs 44 in region A.

Tandem switches 26, 46, STPs 24, 44 and SCPs 22, 42 typically provide voice and data traffic 70 and network signaling protocols 60 between customers in different geographic areas. For example, tandem switches 26, 46 transfer voice and data traffic 70 between regions. Tandem switches such as AIT No. 4 ESS and Northern Telecom DMS 100 are well known in the art. In addition to the tandem connection, it should be understood that SSPs in different areas may also transfer voice and data traffic directly between each other.

STPs 24, 44 communicate with SCPs 22, 42 to transfer network signaling protocols 60. STPs 24, 44 also transfer network signaling protocols 60 between regions. SCPs 22, 42 may also transfer network signaling protocols between region A and region B via STPs 24, 44. A STP and a SCP preferably include a microprocessor controlled computer system using computer peripherals controlled by application software programmed to implement the appropriate communication functions. STPs and SCPs are available from a number of telephone switch venders such as AT&T (Lucent Technologies), Nortel, and Siemens, for example.

Referring again to FIG. 1, the process of identifying the name of a calling party 32 in the preferred embodiment begins when the calling party 32 lifts the telephone receiver and sends the number of the called party 52 to the SSP 28. The SSP 28 of calling party 32 sends a network signaling protocol 60 to STP 24 which routes the network signaling protocol signal 60 to the SSP 50 of the called party 52. The network signaling protocol 60 alerts the called party's SSP 50 that calling party 32 is attempting to terminate a call to the called party 52.

In the AIN of the present embodiment, central databases 23, 43 at SCPs 22, 42 store information identifying the types of terminating services available to each subscriber 34, 54. This information determines how SCPs 23, 43 will handle queries sent from the called party's SSP 50.

When the called party's SSP 50 attempts to terminate the call, SSP 50 triggers a query to its SCP 42 via STP 44. In particular, SSP 50 sends the triggered query over the signaling network via STP 44 to SCP 42 as it would send a network signaling protocol 60. The triggered query preferably contains the 10 digit telephone number of calling party 32. Preferably, SSP 50 has software with an associated computer processor and memory which recognizes the network signaling protocol identifying an incoming call attempt. In response, SSP 50 software formulates the trigger query and transmits it to STP 44 as it would a network signal protocol message.

The triggered query requests SCP database 43 to identify the terminating services available to the called party 52. For example, SCP database 43 may contain information identifying the terminating services available for each telephone number in the form of a database or lookup table in a memory storage device such as random access memory, or a magnetic or optical disk drive, known to those skilled in the art. Of course, a combination of different memory storage devices or other types of devices may be used. The memory storage device preferably stores the service information in a data record such as an array, lookup or pointer table or other data structure known to those skilled in the art. Upon receiving the triggered query, SCP 42 preferably indexes the called party's number into SCP database 43 to obtain the information regarding the services available to the called party 52. If caller identification is available in the SCP database, SCP 42 will attempt to determine the name of the calling party 32. In the preferred embodiment, the trigger query contains the calling party's 10 digit telephone number.

Figure 2:
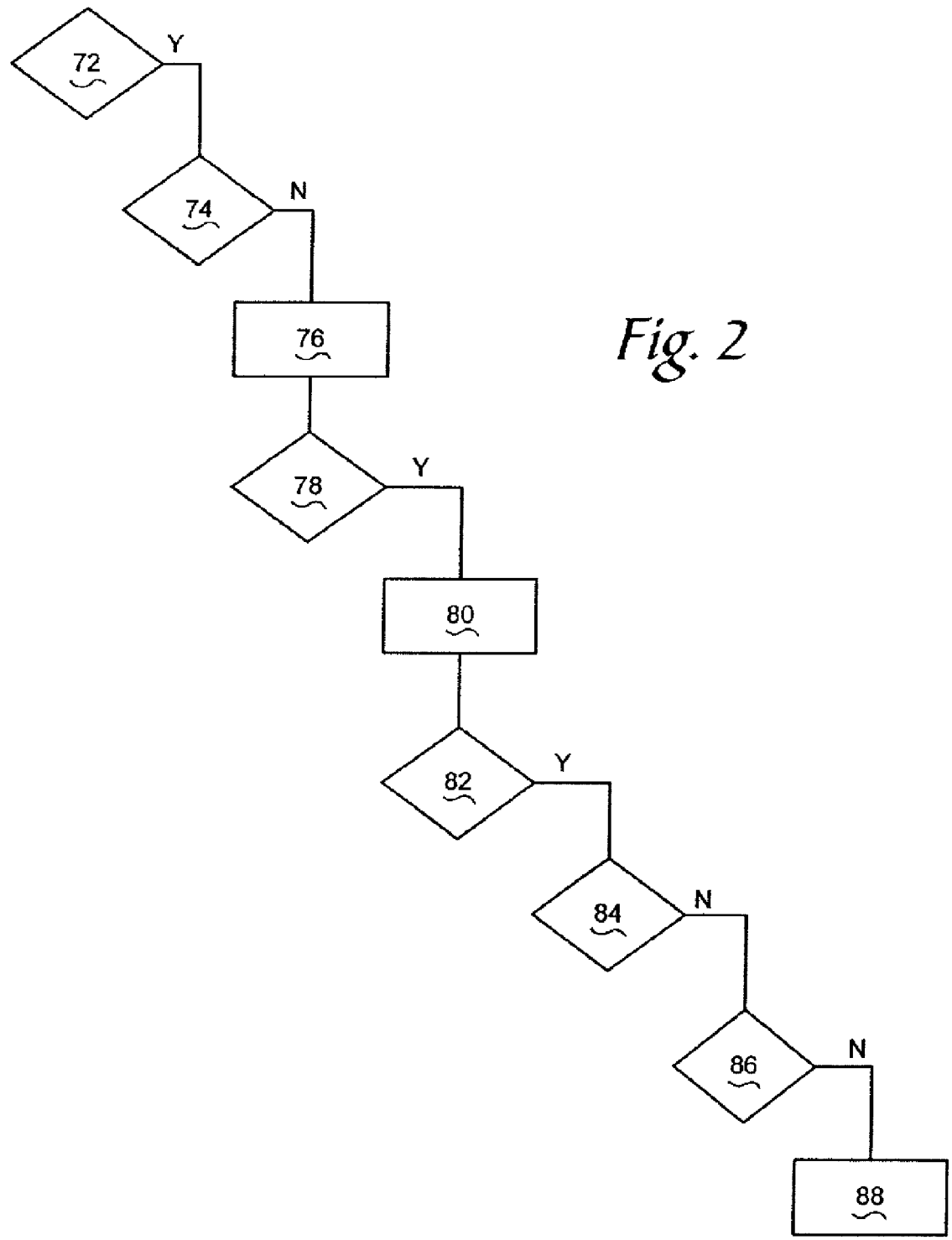
FIG. 2 is a flow chart of the method searching a database of the present invention utilized in the telephone network of FIG. 1.

Referring now to FIG. 2, SCP 42 (FIG. 1) determines 72 whether the calling party's number has been received. If the number has been received, SCP 42 determines 74 whether the calling party 32 has placed any restrictions on the disclosure of his name by requesting that it not be disclosed. If there are no restrictions, SCP 42 performs 76 an initial analysis of the calling party's ten digit telephone number. Preferably, SCP 42 analyzes the first six digits of the number to determine 78 whether the calling party name is within SCP database 43. The first six digits of a ten digit telephone number are typically referred to as a NPANXX combination. For example, a NPANXX contains an area code and prefix such as 312-321. Alternatively, SCP 42 may analyze the first three digits of the calling party's telephone number to determine whether a calling party's name is within database 43.

Preferably, SCP 42 analyzes the NPANXX by searching database 43 containing all of the combinations of the NPANXX of all the phone numbers available within the database. If the NPANXX of the calling party's telephone number is found within the database, then the calling party name is available and can be determined by matching the last 4 digits of the calling party number.

SCP 42 attempts to find the calling party's name by searching 80 for the calling party's 10 digit telephone number. SCP 42 searches database 43 for a record which contains a 10 digit telephone number matching the calling party's 10 digit telephone number and a name that corresponds to the number. If a match is found, SCP 42 retrieves 82 the record from database 43 is not blank. SCP 42 checks 84 to make sure that the name that was included in the record which was retrieved from database 43 is not blank. If a name was returned, SCP 42 again checks 86 to see if there are any restrictions regarding the disclosure of the calling party's name. If there are no restrictions, SCP 42 delivers 88 the name to the called party's SSP 50. SSP 50 delivers the calling party's name and telephone number to the called party 52.

It is to be understood that foregoing detailed description is exemplary and explanatory and is intended to provide further explanation of the invention as claimed. Numerous modifications and variations are possible. The invention, together with the further objects and intended advantages, will best be understood by reference to the preceding detailed description, taken in conjunction with the accompanying drawings.

The invention claimed is:

1. A system for identifying a name associated with a calling party's telephone number, the system comprising:
   a first network element operative to:
   determine whether there are any restrictions on the disclosure of a name associated with a calling party's telephone number;
   obtain the name associated with the calling party's telephone number when it is determined that the calling party's telephone number is present in a database; and
   transmit the name associated with the calling party's telephone number to a second network element.

2. The system of claim 1, wherein the first network element is a service control point.

3. The system of claim 1, wherein the first network element is further operative to determine whether a query is requesting the name associated with the calling party's telephone number.

4. The system of claim 3, further comprising:
   the second network element, the second network element operative to trigger the query to the first network element requesting the name associated with the calling party's telephone number.

5. The system of claim 4, wherein the second network element is a service switching point.

6. The system of claim 4, wherein the second network element is further operative to transmit the name associated with the calling party's telephone number to a called party.

7. The system of claim 4, wherein the first and second network elements are configured in an advanced intelligent network.

8. The system of claim 4, wherein the first and second network elements communicate using a network signalizing protocol.

9. A method for identifying a name associated with a calling party's telephone number, the method comprising:
   determining whether there are any restrictions on the disclosure of a name associated with a calling party's telephone number;
   obtaining the name associated with the calling party's telephone when it is determined that the calling party's telephone number is present in a database; and transmitting the name associated with the calling party's telephone number to a network element when it is determined there are no restrictions on the disclosure of the name associated with the calling party's telephone number.

10. The method of claim 9, further comprising:
receiving a query transmitted from the network element; and
determining that the query is requesting the name associated with the calling party's telephone number.

11. The method of claim 10, wherein the network element is a service switching point.

12. The method of claim 10, wherein determining that the query is requesting the name associated with the calling party's telephone number comprises:
analyzing subscriber service information to determine that the query is requesting the name associated with the calling party's telephone number.

13. The method of claim 9, further comprising:
delivering the name associated with the calling party's telephone number to a called party.

14. A computer-readable storage medium comprising a set of instructions for identifying a name associated with the a calling party's telephone number, the set of instructions to direct a processor to perform acts of:
determining whether there are any restrictions on the disclosure of a name associated with a calling party's telephone number;
obtaining the name associated with the calling party's telephone when it is determined that the calling party's telephone number is present in a database; and
transmitting the name associated with the calling party's telephone number to a network element when it is determined there are no restrictions on the disclosure of the name associated with the calling party's telephone number.

15. The computer-readable storage medium of claim 14, further comprising a set of instructions to direct a processor to perform acts of:
receiving a query transmitted from the network element; and
determining that the query is requesting the name associated with the calling party's telephone number.

16. The computer-readable storage medium of claim 15, wherein the network element is a service switching point.

17. The computer-readable storage medium of claim 15, wherein determining that the query is requesting the name associated with the calling party's telephone number comprises:
analyzing subscriber service information to determine that the query is requesting the name associated with the calling party's telephone number.

18. The computer-readable storage medium of claim 14, further comprising a set of instructions to direct a processor to perform acts of:
delivering the name associated with the calling party's telephone number to a called party.

* * * * *